United States Patent [19]

Cohen et al.

[11] 3,809,920

[45] May 7, 1974

[54] POLYMERIC PYROELECTRIC DETECTOR

[75] Inventors: Julius Cohen; Seymour Edelman, both of Silver Spring, Md.; Carol F. Vezzetti, Arlington, Va.

[73] Assignee: The United States of America as represented by the Secretary of the Navy, Washington, D.C.

[22] Filed: Aug. 25, 1972

[21] Appl. No.: 283,867

[52] U.S. Cl. .......... 307/88 ET
[51] Int. Cl. .......... H01g 7/02
[58] Field of Search .......... 307/88 ET

[56] References Cited

UNITED STATES PATENTS 3,607,754 9/1971 Asahina et al. .......... 307/88 ET
3,517,206 6/1970 Oliver .......... 307/88 ET

*Primary Examiner*—James W. Moffitt
*Attorney, Agent, or Firm*—R. S. Sciascia; P. Schneider

[57] ABSTRACT

A polymer pyroelectric detector made by selecting a film of polymeric material which has dipoles in its molecular structure, physically treating the film so that the dipoles have a net orientation and coating the upper and lower surfaces of the film with thin films of conductive material to act as electrodes. Detectors made from PVF or $PVF_2$ are sensitive to a wide range of electromagnetic radiation, especially radiation in the IR region.

3 Claims, 2 Drawing Figures

POLYMERIC PYROELECTRIC DETECTOR

BACKGROUND OF THE INVENTION

This invention relates to radiation detectors and especially to detectors using polymeric materials as the sensitive element.

Heat-sensitive materials are employed widely as fire detectors and as intrusion alarm elements. Materials now used as pyroelectric detectors, such as triglycine sulphate crystals, for example, may be hygroscopic, may be difficult and/or expensive to fabricate into detectors, or may not retain their polarization very long. Polymers, on the other hand, are not hygroscopic, retain their polarization for long periods and are simple and inexpensive to fabricate into detectors.

SUMMARY OF THE INVENTION

Certain polymers, such as polyvinylidene fluoride, which contain dipoles are poled by subjecting them to heat and a high unvarying electric field. The material then becomes sensitive to a wide range of electromagnetic radiation and may be used as a detector element which produces a charge in response to irradiation.

OBJECTS OF THE INVENTION

An object of this invention is to make certain polymeric materials sensitive to electromagnetic radiation so that they produce an electric signal in response to irradiation.

Another object is to employ certain polymers as pyroelectric detector elements.

A further object is to employ as the sensitive element in radiation detectors materials which are simple and inexpensive to fabricate, are non-hygroscopic and retain their polarizations for a long period of time.

Other objects, advantages and novel features of the invention will become apparent from the following detailed description of the invention when considered in conjunction with the accompanying drawings.

DESCRIPTION OF THE PREFERRED EMBODIMENT

Figure 1:
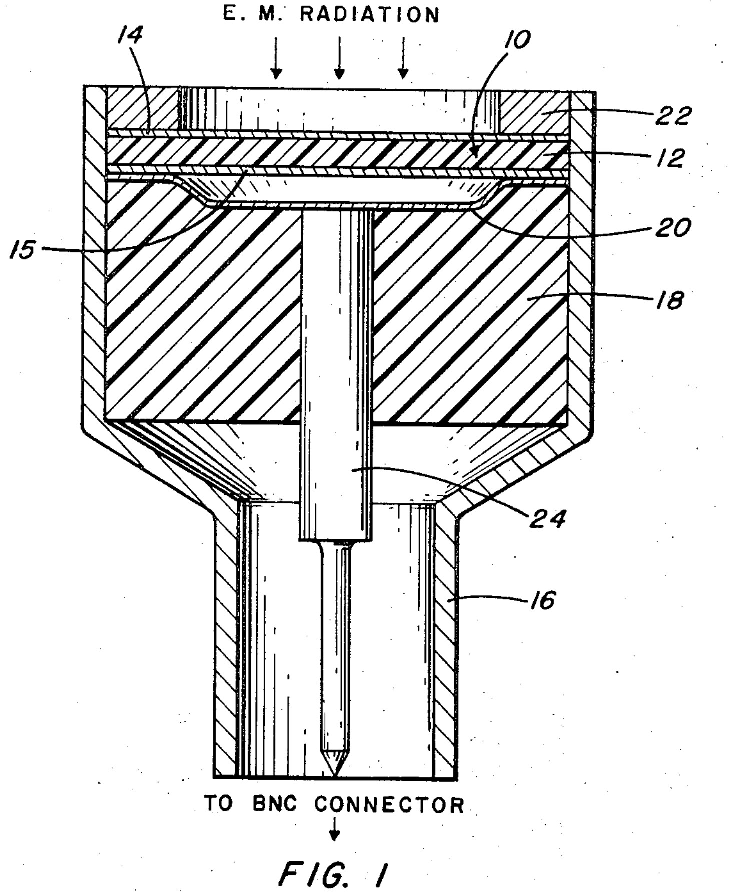
FIG. 1 is a cross-sectional view of an embodiment of the invention.

It has been found that polymers possessing an molecular structure which contains dipoles can be made sensitive to electromagnetic radiation from the ultraviolet through the microwave regions. The method of sensitizing the material is to align some of the dipoles so that there is a net alignment, or orientation, of dipoles in a given direction. It is to be expected, theoretically, that in any chosen direction, for example, the vertical direction, there will be as many dipoles with their positively charged ends pointing upward as pointing downward. If more dipoles have their positively charged ends pointing upward than downward, there will be a net positive orientation in the upward direction. This is what is meant by a "net orientation," and it occurs when as little as 1 or 2 percent of the dipoles are so oriented.

When radiation strikes the oriented polymer, especially infrared radiation, it heats the polymer, thereby causing a change in the dipole moment and upsetting the electrical equilibrium within the material. If electrodes are placed across the surfaces of the polymer, electrical processes occur which endeavor to restore the equilibrium by movement of charges and this movement of charge can be measured.

The polymer, which typically might be a film of about 1 micron in thickness, is physically treated (i.e., oriented, or poled) by heating it (in the case of polyvinyl fluoride, PVF, or polyvinylidene fluoride, $PVF_2$, for example) to between 60° and 125° C. for 10 to 15 minutes while applying a strong dc electric field preferably transversely to the film plane, the field being on the order of several hundred thousand volts per cm., say 500,000 V/cm. The heating facilitates orientation of the dipoles. The material, still under the influence of the field, is then allowed to cool to room temperature and the field is removed. There will now be a net orientation of dipoles in the film transverse to the film surfaces and the material is electrically sensitive to electromagnetic radiation.

It should be noted that the poling field can also be a strong dc electric field in combination with an ac modulating field. The ac field which has been used is not as strong as the dc field and does not change the direction of the field at any time but simply varies the field strength periodically.

Typically, the thickness of the polymeric film might be in the region of one-fourth micron to 1 mil; the electric field about 500 KV/cm; the heating temperature from 60° to 125°C.; and the time during which the heat is applied about 10 to 15 minutes.

It has been found that in the case of $PVF_2$, the output (or sensitivity) is increased if the film is uniaxially stretched and then treated with heat and electric field as described.

These particular polymers (PVF and $PVF_2$) respond to radiation from the ultraviolet, through the visible and infrared bands, into the microwave region. They are very useful in the IR band as pyroelectric elements in fire, flame and intrusion detectors, image tubes, temperature and rate-of-temperature measurement devices, laser radiation detectors, etc.

The polymeric radiation detector 10 is shown in a convenient holder in FIG. 1. The detector, comprising a treated disk of polymeric film 12 coated with a thin nickel film 14 and 15 on upper and lower surface, respectively, is set inside a roughly tubular housing 16 which is made of electrically conductive material such as brass. The nickel films do not extend completely to the edge of the polymeric disk; otherwise the housing would short them out. (If they extend to the housing, they must be electrically insulated therefrom).

The detector 10 sits on a plug 18, preferably of teflon, the upper surface of which is coated with material 20, such as gold on a chromium oxide base, which is a good electrical conductor. A brass retaining ring 22 is set on top of the detector 10 so that the top electrode 14 of the detector 10 makes good electrical contact with the housing 16. A brass pin 24 extends upward through a bore in the teflon plug 18 making electrical contact with the gold film 20 which, in turn, is in contact with the bottom electrode 15 of the detector 10. The bottom of the housing is of such size that coupling can be made to an ordinary BNC connector.

Figure 2:
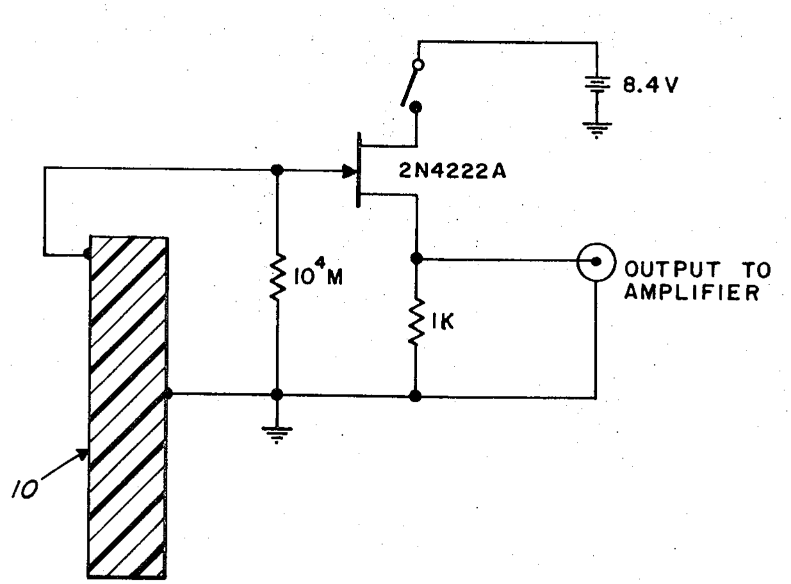
FIG. 2 is a schematic diagram of a circuit.

The detector 10 can be connected to a voltage or current amplifier but, for purposes of impedance matching, it is best to interpose a source follower, as shown in FIG. 2, between the amplifier and the detector. The follower circuit, which is conventional, can be built around a 2N4222A transistor, for example; typical circuit values are shown.

Obviously many modifications and variations of the present invention are possible in the light of the above teachings.

What is claimed is:

1. A pyroelectric detector comprising:

a thin film of polymeric material having a molecular structure containing dipoles, said thin film having a net orientation of said dipoles therein in a given direction;

a thin coating of electrically conductive material on the upper surface of said film; and a thin coating of an electrically conductive material on the lower surface of said film, said coatings comprising electrodes for the connection of electrical leads and being thin enough to permit electromagnetic radiation to pass through to said polymeric film.

2. A detector as in claim 1, wherein said film is fabricated from polyvinyl fluoride.

3. A detector as in claim 1, wherein said film is fabricated from polyvinylidene fluoride.

* * * * *